Oct. 18, 1932.   C. F. CHAPMAN   1,883,554
THERMOMETER
Filed Sept. 24, 1931
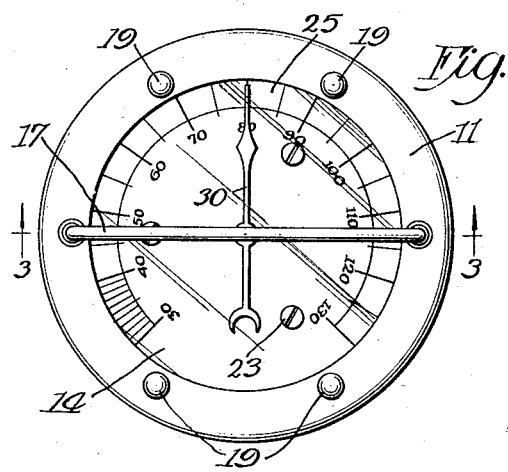
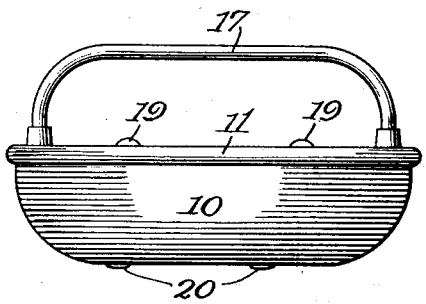
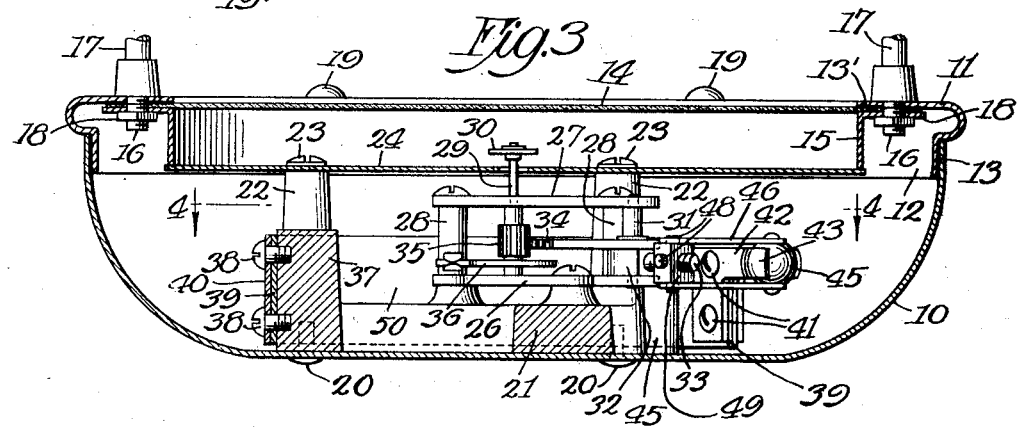
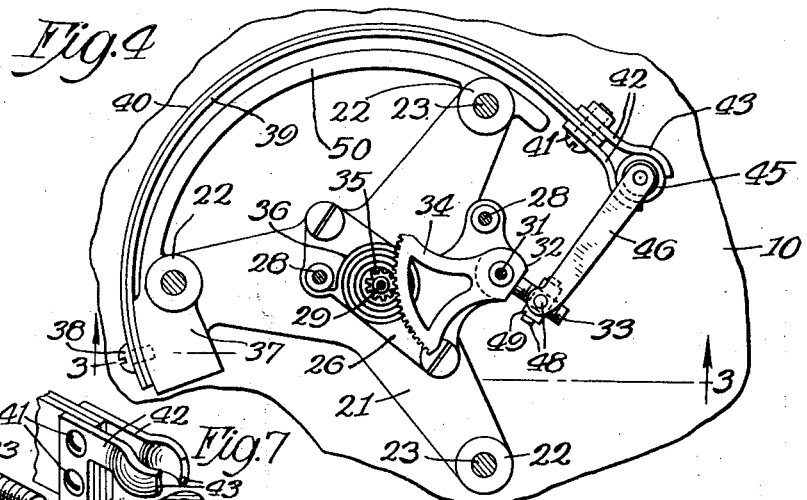
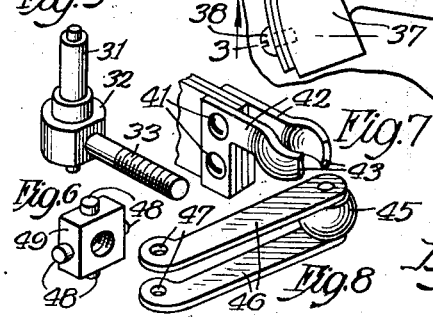
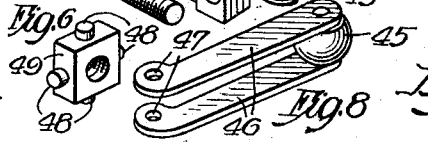
Inventor
Charles F. Chapman
By Fisher, Clapp, Soans & Pond Attys Patented Oct. 18, 1932

1,883,554

UNITED STATES PATENT OFFICE

CHARLES F. CHAPMAN, OF CHICAGO, ILLINOIS, ASSIGNOR TO KRAFT-PHENIX CHEESE CORPORATION, OF CHICAGO, ILLINOIS, A CORPORATION OF DELAWARE

THERMOMETER

Application filed September 24, 1931. Serial No. 564,880.

This invention relates to the art of heat measuring instruments, having reference more particularly, although not exclusively, to thermometers of that type which employ a bi-metallic strip as the heat sensitive agent to effect movements of a scale pointer or indicator.

The instrument forming the subject matter of the present invention has been designed more especially for indicating the temperature of liquids or semi-liquids, and one object of the invention has been to provide a reliable thermometer which may float on the surface of the liquid and does not require to be manually immersed in the latter in order to accurately indicate the temperature of the liquid. Another object is to provide an instrument of such construction as to eliminate the possibility of broken glass or other foreign material being left in the liquid in case of the instrument being accidentally broken while in service.

Other objects are to provide an instrument readily adaptable to an interchange of different scale dials, to provide an instrument of the encased type which may be readily sealed against access of air at room temperature to the actuating element of the instrument, to provide, in an instrument of this type, means for transmitting the heat rapidly and uniformly to the full length of the bi-metallic actuator, to provide an instrument that may easily be moved over a table or other flat surface, to provide an instrument wherein the transparent scale covering disc or bezel shall be protected from accidental injury and from impairment of visibility by reason of condensed moisture within the case, and, generally, to provide an improved thermometer of the type indicated well adapted as a heat measuring instrument for liquid and semi-liquid bodies on the flotation principle.

Still other objects and attendant advantages of the invention will be apparent to persons familiar with instruments of this type from the following description, taken in connection with the accompanying drawing in which I have illustrated one simple and practical mechanical embodiment of the invention, and wherein—

Fig. 1 is a top plan view of the instrument.
Fig. 2 is a side elevation of the same.
Fig. 3 is a vertical transverse section on the line 3—3 of Figs. 1 and 4.
Fig. 4 is a plan section on the line 4—4 of Fig. 3.
Fig. 5 is a detail perspective view of the segment rack arbor and a radial arm associated therewith.
Fig. 6 is a detail perspective view of a nut that engages the threaded radial arm on the segment rack arbor.
Fig. 7 is a perspective detail view of a ball joint member that is mounted on the free end of the bimetallic actuator strip.
Fig. 8 is a perspective detail view of a forked link and cooperating ball joint member that connect the members shown in Figs. 6 and 7.

Referring to the drawing, 10 designates a shallow generally cup-shaped member forming the body portion of the case in which the parts of the instrument are housed, and 11 designates as an entirety, a cap or cover member that is formed with an inwardly offset depending flange 12 that has a tight fit in the top of the body member 10. An hermetically sealed joint is provided at this point by a film of shellac indicated at 13 between the contacting surfaces of the body member and cover, for purposes hereinafter disclosed.

The cover member 11 is formed with a large circular opening that is closed by a transparent disc 14 preferably of mica or other non-frangible material. The marginal portion of the disc 14 preferably underlies the cover 11, and beneath the marginal portion of the disc 14 is an angle strip ring 15. The cover 11, the disc 14, and the horizontal limb of the ring 15 are secured together by the threaded ends 16 of a handle or bail 17 extending therethrough and engaged by nuts 18, and also by additional short bolts 19. A film of shellac 13′ is also interposed between the adjacent surfaces of the cover 11 and the bezel disc 14 to complete the sealing of the case. This bail 17 serves not only as a handle, but also as a protecting bar to prevent accidental injury to the disc 14.

Attached by studs 20 to the bottom wall of the cup-shaped body 10 is a three-limb casting designated as an entirety by 21. The limbs of this casting are formed at their free ends with upstanding internally tapped posts 22, on which is secured, as by screw 23, a scale disc 24 provided with a peripheral scale 25 (Fig. 1).

Mounted on the central portion of the spider 21 is a frame comprising lower and upper plates 26 and 27 and spacing posts 28, in which frame is journaled an arbor 29, the upper end of which extends through a hole in the dial plate 24 and is equipped with the usual pointer 30, the tip of which plays over the scale 25. Also journaled in and between the frame plates 26 and 27 is an arbor 31 that, as best shown in Fig. 5, is formed with a hub 32 carrying a radial screw threaded arm 33. Mounted on and secured fast with the upper reduced portion of the hub 32 is a segment rack 34 (Fig. 4), that meshes with a pinion 35 fast on the pointer arbor 29. A spiral spring 36 anchored at one end to one of the posts 28 and attached at its other end to the arbor 29 normally urges the pointer 30 toward the low point of the scale, or against the pull of the actuator bar.

Cast integral with one of the posts 22 of the main spider 21 is a lug 37, to the outer side of which is attached, as by screws 38, one end of the bi-metallic actuator strip, consisting of two curved metal strips having different co-efficients of expansion, such as an inner strip 39 of brass and an outer strip 40 of invar-steel, soldered together. To the free end of this strip are attached, as by bolts 41, a pair of mating arms 42 formed with opposed rounded concave hands 43 (Fig. 7) that clampingly embrace the ball-shaped hub 45 of a forked link 46, shown in detail in Fig. 8; the members 43 and 45 thus forming a universal joint of the ball and socket type. The limbs of the link 46 are flat steel springs and at their free ends are apertured, as shown at 47, to embrace opposite studs or pins 48 that are formed on the four sides of a nut 49 (Fig. 6) that is mounted on the radial arm 33. The parts last described manifestly form a flexible universal joint connection between the free end of the actuator strip and the rod 33, through which, as the actuator strip expands or contracts at temperatures above or below neutral (for example 80° F.) the segment rack 34 is turned, and the pointer 30 is moved forwardly or backwardly over the scale. This flexible connection permits adjustment of the nut 48 by a quarter turn or multiples thereof lengthwise of the radial arm 33, by which variations in the swing of the scale pointer under a given expansion or contraction of the actuator strip may be effected, so that scale discs 24 carrying different scales such as Fahrenheit, centigrade, etc., may be employed as desired. The universal joint connection between the actuator strip and the link 46 performs an important function in preventing the transmission to the arbor 31 of any warp or twist that may occur in the actuator strip, thus insuring the free turning movement of the arbor 31.

Lying opposite the inner or concave side of the actuator strip, approximately parallel therewith and narrowly spaced therefrom, is a rib 50 that is preferably integral with the spider casting 21 and at its lower edge lies in contact with the bottom wall of the casing 10. The top edge of this rib is substantially on a level with the top edge of the actuator strip. The heat of the material undergoing thermic measurement is rapidly transmitted by conduction through the wall of the vessel 10 to the rib 50, and thence by convection to the actuator strip, simultaneously and equally raising the temperature of the latter throughout its full length, and thus reducing the lag to a minimum.

In an instrument of this type it is highly desirable to avoid the presence of any moisture within the case, since, under low temperatures the moisture may condense and cause rust to form on the arbors, as well as cloud the under side of the transparent bezel disc and so impair the visibility, and under high temperatures steam or vapor may form, with the same objectionable consequences. Accordingly in the preferred and most perfect form of the invention the case is filled with nitrogen or other moisture-free gas, such as carbon dioxide or air from which the moisture has been extracted by freezing, and this moisture-free gas is retained by the hermetically sealed joints 13 and 13'. This can easily be done, after the parts carried by the body and cover have been assembled, by simply assembling the body and cover in a bath of the moisture-free gas.

It will be observed that the transparent cover disc or bezel 14, the scale plate 24, and the vertical limb of the ring 15 form a closed circular chamber within which the pointer 30 and the upper end of its arbor 29 are housed.

The stationary parts, such as the casing and the spider 21 are preferably made of a light metal, such as aluminum, and the casing is sufficiently large relatively to its weight, to cause the instrument to readily float even on comparatively thin liquids. The instrument has been designed mainly to measure the heat of cheese during the sterilizing or blending processes, but manifestly it may be used to advantage in many other relations, such as measuring the temperature of water in a bath tub.

While I have herein shown and described one embodiment of the invention which, in practice, has been found to satisfactorily effectuate the stated purposes and objects thereof, I do not limit the invention to the details shown and described, but reserve such variations, modifications and mechanical equivalents as fall within the spirit and purview of the appended claims.

I claim:

1. In a thermometer of the type described, the combination with a case of heat conducting material, of a scale, an indicator movable over said scale, movement multiplying mechanism connected to said indicator and including an arbor provided with a radial threaded arm, a nut on said arm, a bi-metallic actuator strip secured at one end by heat conducting means within and to said case, and a link pivotally connecting the free end of said strip and said nut.

2. In a thermometer of the type described, the combination with a case of heat conducting material, of a scale, an indicator movable over said scale, movement multiplying mechanism connected to said indicator, a bi-metallic actuator strip secured at one end by heat conducting means within and to said case, and a connection, including a universal joint, between the free end of said strip and an element of said movement multiplying mechanism.

3. In a thermometer of the type described, the combination with a case of heat conducting material, of a scale, an indicator movable over said scale, movement multiplying mechanism connected to said indicator and including an arbor provided with a radial threaded arm, a nut on said arm, a bi-metallic actuator strip secured at one end by heat conducting means within and to said case, and a link having a universal joint connection at one end to the free end of said strip and pivotally connected at its other end to said nut.

4. In a thermometer of the type described, the combination with a case of heat conducting material, of a scale, an indicator movable over said scale, movement multiplying mechanism connected to said indicator and including an arbor provided with a radial threaded arm, a nut on said arm equipped with a plurality of pairs of radially opposed pins on its sides, a bi-metallic actuator strip secured at one end by heat conducting means within and to said case, and a forked link having a universal joint connection at one end to the free end of said strip and pivoted at its other end on a pair of said radially opposed pins.

5. In a thermometer, the combination with a case of heat conducting material adapted to float on a liquid, of temperature-indicating means mounted in said case and subjected to temperature variations transmitted thereto through said case, said case having in its top wall a bezel of transparent non-frangible material overlying said indicating means.

6. In a thermometer, the combination with a case of heat conducting material adapted to float on a liquid, of temperature-indicating means mounted in said case and subjected to temperature variations transmitted thereto through said case, said case having in its top wall a bezel of transparent non-frangible material overlying said indicating means, and a fixed handle bar spanning the top of said case and forming a guard for said bezel.

7. In a thermometer of the type described, the combination with a case of heat conducting material adapted to float on a liquid, of mechanical temperature indicating means mounted in said case, said means including a flexible bi-metallic actuator strip, and a fixed heat transmitting rib lying in contact with a wall of said case and disposed along side of and narrowly spaced from said actuator strip.

8. In a thermometer of the type described, the combination with an hermetically sealed case, of temperature-indicating means in said case, and a body of moisture-free gas filling said case.

9. In a thermometer of the type described, the combination with a case comprising a body member, a cover having an hermetically sealed joint with said body member, and a transparent bezel having an hermetically sealed joint with said cover, of temperature-indicating means in said case, and a body of moisture-free gas filling said case.

10. In a thermometer of the type described, the combination with a generally cup-shaped case of heat conducting material adapted to float on a liquid, of a frame structure supported on the bottom wall of said case, mechanical temperature-indicating means mounted on said frame structure, and headed studs attaching said frame structure to said bottom wall, the heads of said studs forming glider feet to support the instrument on a table or other flat surface.

CHARLES F. CHAPMAN.